US008249131B2

(12) United States Patent
Lee et al.

(10) Patent No.: US 8,249,131 B2
(45) Date of Patent: Aug. 21, 2012

(54) METHOD FOR TRANSMITTING SIGNALS FOR INTERFERENCE RANDOMIZATION

(75) Inventors: Dae Won Lee, Anyang-si (KR); Nam Yul Yu, Anyang-si (KR); Dong Wook Roh, Anyang-si (KR); Sung Hoon Chung, Anyang-si (KR); Jung Hoon Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 99 days.

(21) Appl. No.: 12/680,683

(22) PCT Filed: Oct. 1, 2008

(86) PCT No.: PCT/KR2008/005777
§ 371 (c)(1),
(2), (4) Date: Jun. 7, 2010

(87) PCT Pub. No.: WO2009/045045
PCT Pub. Date: Apr. 9, 2009

(65) Prior Publication Data
US 2010/0238979 A1    Sep. 23, 2010

Related U.S. Application Data

(60) Provisional application No. 60/976,488, filed on Oct. 1, 2007.

(30) Foreign Application Priority Data

Sep. 30, 2008  (KR) ........................ 10-2008-0095976

(51) Int. Cl.
*H04B 1/707* (2011.01)
*H04K 1/10* (2006.01)
*H04L 27/28* (2006.01)

(52) U.S. Cl. .................... 375/146; 375/130; 375/260

(58) Field of Classification Search .................. 375/132, 375/146, 260, 267, 259; 455/101; 370/209
See application file for complete search history.

(56) References Cited

U.S. PATENT DOCUMENTS

| | | | | |
|---|---|---|---|---|
| 6,163,524 A | * | 12/2000 | Magnusson et al. | 370/208 |
| 6,215,813 B1 | * | 4/2001 | Jones et al. | 375/146 |
| 7,551,546 B2 | * | 6/2009 | Ma et al. | 370/208 |
| 2006/0215773 A1 | | 9/2006 | Jeon et al. | |

OTHER PUBLICATIONS

3GPP TS 36.211 V8.0.0, Sep. 2007.*
Fu, W, et al., "A New Look at Coding and Decoding Algorithm for SFC-OFDM System," Proceedings of the 19th International Conference on Advanced Information Networking and Applications (AINA '05), pp. 91-94, Mar. 28-30, 2005.
Wavegedara, K.C.B., et al., "Space-Time-Coded CDMA Uplink Transmission With MUI-Free Reception," IEEE Transactions on Wireless Communications, vol. 4, No. 6, pp. 3095-3105, Nov. 2005.
Yu, G., et al., "Quasi-Ortogonal Space-Frequency Block Code," IEEE International Symposium on Communications and Information Technologies, pp. 979-982, Oct. 26-29, 2004.

* cited by examiner

*Primary Examiner* — David Ometz
*Assistant Examiner* — Ross Varndell
(74) *Attorney, Agent, or Firm* — Birch, Stewart, Kolasch & Birch, LLP

(57) ABSTRACT

A method for transmitting signals for interference randomization is disclosed. The method for transmitting signals includes spreading the transmission signals using a plurality of orthogonal codes and transmitting the transmission signals spread by the plurality of orthogonal codes by a spatial frequency block coding (SFBC) or spatial time block coding (STBC) scheme. Among the plurality of orthogonal codes, codes of which mutual interferences are equal to or greater than a predetermined threshold are grouped to the same group, and orthogonal codes belonging to different groups are used for the spreading of the signals which are transmitted at the same timing. Accordingly, it is possible to realize interference randomization.

8 Claims, 6 Drawing Sheets

US 8,249,131 B2

METHOD FOR TRANSMITTING SIGNALS FOR INTERFERENCE RANDOMIZATION

CROSS REFERENCE TO RELATED APPLICATIONS

This application is the National Phase of PCT/KR2008/005777 filed on Oct. 1, 2008 which claims priority under 35 U.S.C. 119(e) of U.S. Provisional Application Ser. No. 60/976,488 filed on Oct.1, 2007 and under 35 U.S.C. 119(a) to Patent Application No. 10-2008-0095976 filed in Korea, on Sep. 30, 2008. The entire contents of all of the above applications are hereby incorporated by reference into the present application.

TECHNICAL FIELD

The present invention relates to a radio communication system, and more particularly, to a method for solving interference imbalance which may be generated when signals spread using orthogonal codes are transmitted via a plurality of antennas according to an Alamouti scheme.

BACKGROUND ART

First, a MIMO technology applied to the present invention will be briefly described.

The MIMO is abbreviated from the term "multi-input multi-output" and indicates a method of employing multiple transmission antennas and multiple reception antennas so as to improve transmission/reception data efficiency, instead of a conventional method using one transmission antenna and one reception antenna. That is, the MIMO technology indicates a technology of collecting data pieces received via several antennas and completing one message, not depending wholly on a single antenna path in order to receive one message. According to the MIMO technology, a data transmission rate is improved in a specific range or a system range can be increased with respect to a specific data transmission rate. That is, the MIMO technology is the next-generation mobile communication technology which is widely applicable to mobile communication terminals and repeaters.

FIG. 1 is a view showing the configuration of a general MIMO antenna system.

As shown in FIG. 1, if the number of antennas is increased in both a transmitter and a receiver, a theoretical channel transmission capacity is increased in proportion to the number of antennas, unlike the case where multiple antennas are used in only one of the transmitter and the receiver. Thus, frequency efficiency can be remarkably improved.

After the theoretical capacity increase of the MIMO system was proved in the mid-1990s, various technologies for substantially improving a data transmission rate have been actively developed up to now. Among them, several technologies are already applied to the various radio communication standards such as the third-generation mobile communication and the next-generation wireless local area network (LAN).

According to the researches into the MIMO antenna up to now, various researches such as researches into information theory related to the computation of the communication capacity of a MIMO antenna in various channel environments and multiple access environments, researches into the model and the measurement of the radio channels of the MIMO system, and researches into space-time signal processing technologies of improving transmission reliability and transmission rate have been actively conducted.

The MIMO technology includes a spatial diversity method for increasing transmission reliability using symbols passing through various channel paths and a spatial multiplexing method for improving a transmission rate by simultaneously transmitting a plurality of data symbols using a plurality of transmission antennas. Recently, researches into a method of obtaining the respective advantages of the above two methods by combining the two above-described methods are ongoing.

Hereinafter, a method of using an Alamouti code for transmission diversity in the MIMO system will be described.

For the easy analysis in a transmission diversity (hereinafter, abbreviated to "Tx Div") structure using the Alamouti code, one can change the concept of the receiver as an equivalent receiver (Rx) shown in FIG. 2

FIG. 2 is a view showing the structure of the equivalent receiver in order to facilitate the description of the system using the Alamouti code.

That is, if a conjugate complex number is applied to a second reception signal for mathematical modeling of the reception signal in the diversity transmission method using the Alamouti code, more efficient mathematical modeling is possible. FIG. 2 shows that the reception signal can be expressed in a matrix form by applying the conjugate complex number to the receiver at a time 2 or a frequency 2. Hereinafter, the detailed mathematical modeling using the conjugate complex number will be described.

As the matrix of the Alamouti code, two matrixes can be considered as follows.

$$\begin{bmatrix} s_1 & -s_2^* \\ s_2 & s_1^* \end{bmatrix} \quad \text{Equation 1}$$

$$\begin{bmatrix} s_1 & s_2 \\ -s_2^* & s_1^* \end{bmatrix} \quad \text{Equation 2}$$

In the matrixes of Equation 1 and Equation 2, each column denotes a time or a frequency and each row denotes the antenna. In more detail, the matrix of Equation 1 indicates a general equation of a matrix which is first suggested in the paper of Alamouti, and Equation 2 indicates a matrix used in the $3^{rd}$ Generation Partnership Project Long Term Evolution (3GPP LTE) standard. That is, Equation 2 indicates a matrix which is reconfigured such that the signal transmitted via an antenna 1 by a single-input single-output (SISO) scheme using only one antenna becomes equal to the signal transmitted via the antenna 1 by an Alamouti scheme.

In the above-described equations, if each column denotes the time, the Alamouti code is used as a kind of a space time block code (STBC) and, if each column denotes the frequency, the Alamouti code is used as a kind of a space frequency block code (SFBC).

In the current discussion about the next-generation radio communication system, a method of spreading transmission signals by orthogonal codes and transmitting the spread signals via multiple antennas according to the Alamouti scheme is used. In this case, an interference imbalance problem may be generated between specific codes, but has not been considered seriously up to now.

DISCLOSURE

Technical Problem

An object of the present invention devised to solve the problem lies on a method of transmitting a signal, which is capable of solving interference imbalance which may be generated in a transmission method for spreading a transmitted signal by an orthogonal code and acquiring frequency domain diversity according to an Alamouti scheme.

Technical Solution

The object of the present invention can be achieved by providing a method for transmitting signals, the method including: spreading the transmission signals using a plurality of orthogonal codes; and transmitting the transmission signals spread by the plurality of orthogonal codes using a spatial frequency block coding (SFBC) scheme or spatial time block coding (STBC) scheme, wherein, among the plurality of orthogonal codes, codes of which mutual interferences are equal to or greater than a predetermined threshold are grouped to the same group, and orthogonal codes belonging to different groups are used for the spreading of the signals which are transmitted at the same timing.

At this time, the orthogonal codes may be Walsh codes and the transmission signals spread by the Walsh codes may be transmitted using the SFBC scheme.

In addition, the transmission signals may be ACK/NACK signals transmitted via a physical hybrid ARQ indicator channel (PHICH) or uplink control signals transmitted via a physical uplink control channel (PUCCH).

The orthogonal codes used in the spreading may be decided by a specific hopping pattern of each user equipment (UE), and the specific hopping pattern may be decided by generating an (n, k) binary code having a largest minimum hamming distance if the number of times of repeated transmission of the transmission signals is n and the number of UEs for transmitting the transmission signals is N ($N=2^k$); grouping the codes of which the mutual interferences are equal to or greater than the predetermined threshold, among the plurality of orthogonal codes, and mapping the groups to "0" or "1" of the generated binary codes; and allocating orthogonal code patterns, which are mapped to the generated binary codes, to the UEs.

Advantageous Effects

If signals are spread using orthogonal codes and are transmitted by an Alamouti scheme according to the embodiments of the present invention, it is possible to solve an interference imbalance problem between specific codes.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings. The detailed description set forth below in connection with the appended drawings is intended as a description of exemplary embodiments and is not intended to represent the only embodiments in which the concepts explained in these embodiments can be practiced.

The detailed description includes details for the purpose of providing an understanding of the present invention. However, it will be apparent to those skilled in the art that these teachings may be implemented and practiced without these specific details. In some instances, well-known structures and devices are omitted in order to avoid obscuring the concepts of the present invention and the important functions of the structures and devices are shown in block diagram form. The same reference numbers will be used throughout the drawings to refer to the same or like parts.

First, an interference imbalance problem which may be generated in a transmission method for spreading transmission signals by orthogonal codes and acquiring frequency domain diversity according to an Alamouti scheme will be described in detail. For example, hereinafter, a mathematical model of a method for spreading signals using Walsh codes of orthogonal codes and acquiring transmission diversity in a frequency domain by a space-frequency block code (SFBC) scheme of the Alamouti scheme will be described. The following description is made in order to explain the problem in detail and the same principle is applicable to the case where other orthogonal codes are used and/or the case where a spatial-time block code (STBC) scheme is used.

First, an example of using Walsh codes having a spreading factor (SF) of 4 will be described.

It is assumed that $c_j=(s_0,s_1,s_2,s_3)$, $0 \leq j \leq 3$ is the Walsh code having SF=4 and $s_i$, $0 \leq i \leq 3$ is a Walsh code chip which is BPSK modulated. At this time, it is assumed that $$s_i \in \left\{ \frac{1+j}{\sqrt{2}}, \frac{-1-j}{\sqrt{2}} \right\}$$

in consideration of a 3GPP LTE system.

Figure 1:
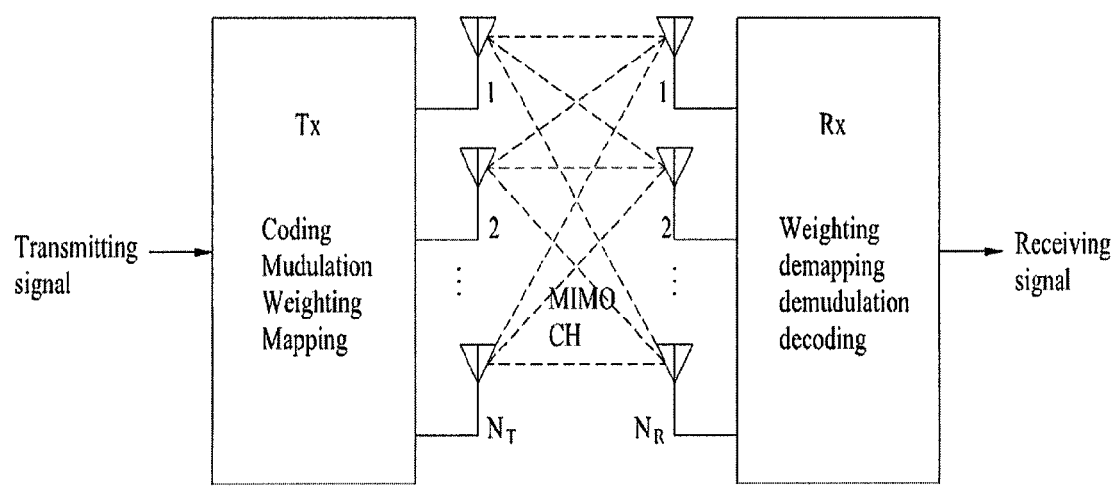
FIG. 1 is a view showing the configuration of a general multi-input multi-output (MIMO) system.
Figure 2:
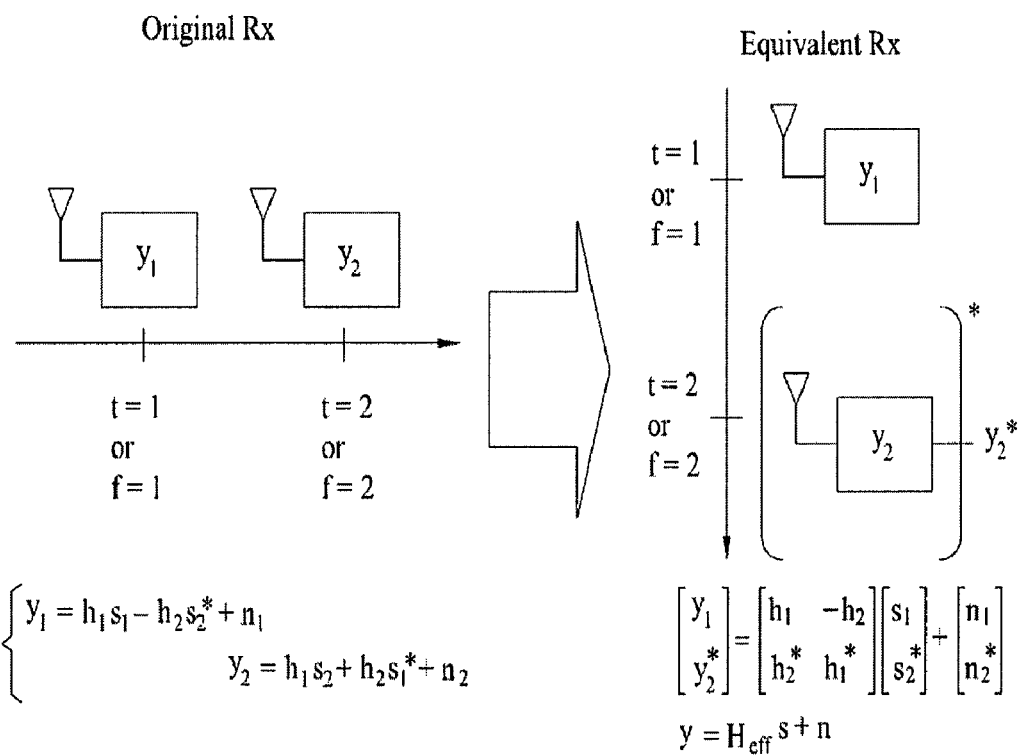
FIG. 2 is a view showing the structure of an equivalent receiver, in order to facilitate the description of a system using an Alamouti code.
Figure 3:
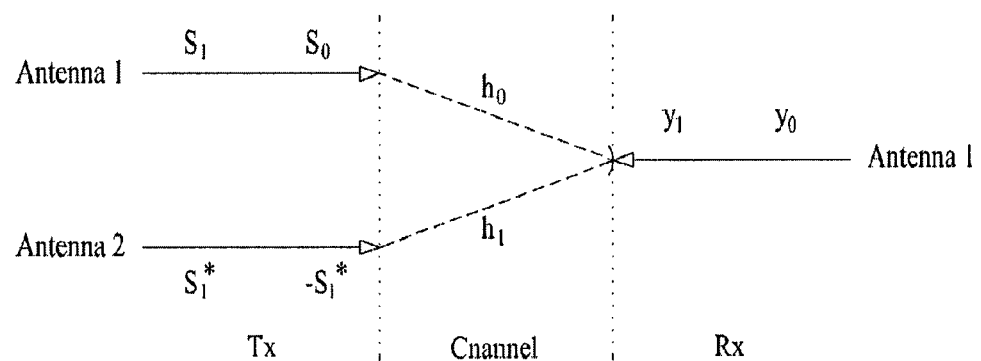
FIG. 3 is a conceptual diagram of a process of transmitting transmission signals $s_0$ and $s_1$ using two transmission antennas by a SFBC scheme and receiving the signals by a receiver using one reception antenna.

FIG. 3 is a conceptual diagram of a process of transmitting transmission signals $s_0$ and $s_1$ using two transmission antennas by an SFBC scheme and receiving the signals by a receiver using one reception antenna.

As shown in FIG. 3, after the Walsh code is transmitted using the SFBC scheme, the Walsh code chip $y_i$, $0 \leq i \leq 3$ acquired by the receiver may be given as follows.

$$\begin{bmatrix} y_0 \\ y_1^* \end{bmatrix} = \begin{bmatrix} h_0 & -h_1 \\ h_1^* & h_0^* \end{bmatrix} \begin{bmatrix} s_0 \\ s_1^* \end{bmatrix} - \begin{bmatrix} n_0 \\ n_1 \end{bmatrix} \quad \text{Equation 3}$$

-continued $$\begin{bmatrix} y_2 \\ y_2^* \end{bmatrix} = \begin{bmatrix} h_2 & -h_3 \\ h_3^* & h_2^* \end{bmatrix} \begin{bmatrix} s_2 \\ s_3^* \end{bmatrix} + \begin{bmatrix} n_2 \\ n_3 \end{bmatrix}$$

After channel estimation is performed by the receiver, the estimated Walsh code chips $\hat{s}_0$ and $\hat{s}_1$ may be expressed as follows.

$$\begin{bmatrix} \hat{s}_0 \\ \hat{s}_1^* \end{bmatrix} = \begin{bmatrix} h_0^* e^{-j\theta_0} & h_1 e^{j\theta_1} \\ -h_1^* e^{-j\theta_1} & h_0 e^{j\theta_0} \end{bmatrix} \begin{bmatrix} h_0 & -h_1 \\ h_1^* & h_0^* \end{bmatrix} \begin{bmatrix} s_0 \\ s_1^* \end{bmatrix} \quad \text{Equation 4}$$

$$= \begin{bmatrix} \alpha s_0 + \beta s_1^* \\ -\beta^* s_0 + \alpha^* s_1^* \end{bmatrix}$$

where $\alpha \equiv (h_0 h_0^* e^{-j\theta_0} + h_1 h_1^* e^{j\theta_1})$ and $\beta \equiv (-h_0^* h_1 e^{-j\theta_0} + h_0^* h_1 e^{j\theta_1})$ Similarly, the estimated Walsh code chips $\hat{s}_3$ and $\hat{s}_4$ may be expressed as follows.

$$\begin{bmatrix} \hat{s}_2 \\ \hat{s}_3^* \end{bmatrix} = \begin{bmatrix} h_2^* e^{-j\theta_2} & h_3 e^{j\theta_3} \\ -h_3^* e^{-j\theta_3} & h_2 e^{j\theta_2} \end{bmatrix} \begin{bmatrix} h_2 & -h_3 \\ h_3^* & h_2^* \end{bmatrix} \begin{bmatrix} s_2 \\ s_3^* \end{bmatrix} \quad \text{Equation 5}$$

$$= \begin{bmatrix} \gamma s_2 + \delta s_3^* \\ -\delta^* s_2 + \gamma^* s_3^* \end{bmatrix}$$

where $\gamma \equiv (h_2 h_2^* e^{-j\theta_2} + h_3 h_3^* e^{j\theta_3})$ and $\delta \equiv (-h_2^* h_3 e^{-j\theta_2} + h_2^* h_3 e^{j\theta_3})$ In Equations 4 and 5, it is noted that a supplementary noise signal component ($n_i$, $0 \leq i \leq 3$) is ignored in order to simplify analysis. Accordingly, the estimated Walsh codes may be given as follows.

$$\hat{c}_j^T = \begin{bmatrix} \hat{s}_0 \\ \hat{s}_1 \\ \hat{s}_2 \\ \hat{s}_3 \end{bmatrix} = \begin{bmatrix} \alpha s_0 + \beta s_1^* \\ \alpha s_1 - \beta s_0^* \\ \gamma s_2 + \delta s_3^* \\ \gamma s_3 - \delta s_2^* \end{bmatrix} = \begin{bmatrix} \alpha s_0 \\ \alpha s_1 \\ \gamma s_2 \\ \gamma s_3 \end{bmatrix} + \begin{bmatrix} \beta s_1^* \\ -\beta s_0^* \\ \delta s_3^* \\ -\delta s_2^* \end{bmatrix} \quad \text{Equation 6}$$

In Equation 6, a first matrix on the right side denotes an actually transmitted signal component with a channel estimation error and a second matrix on the right side denotes a mutual interference signal component due to the SFBC and the channel estimation error.

This mutual interference component is changed according to specific Walsh code forms and thus leads to interference and performance imbalance. Now, such an interference imbalance phenomenon will be described by mathematical modeling.

When the despreading processes of all possible Walsh codes are collectively considered with respect to the estimated Walsh codes $\hat{c}_j^T$ obtained after the despreading process, the following equation can be obtained. Although it is assumed that the information spread by the Walsh codes is 1 during 4 chips of the Walsh codes, generality is not lost.

$$\begin{bmatrix} \hat{c}_0 \\ \hat{c}_1 \\ \hat{c}_2 \\ \hat{c}_3 \end{bmatrix} \cdot W^H = \frac{1+j}{\sqrt{2}} \begin{bmatrix} \alpha & \alpha & \gamma & \gamma \\ \alpha & -\alpha & \gamma & -\gamma \\ \alpha & \alpha & -\gamma & -\gamma \\ \alpha & -\alpha & -\gamma & \gamma \end{bmatrix} \cdot W^H + \quad \text{Equation 7}$$

$$\frac{1-j}{\sqrt{2}} \begin{bmatrix} \beta & -\beta & \delta & -\delta \\ -\beta & -\beta & -\delta & -\delta \\ \beta & -\beta & -\delta & \delta \\ -\beta & -\beta & \delta & \delta \end{bmatrix} \cdot W^H$$

At this time, $W^H$ is the hermitian of a 4*4 Walsh code matrix W which is BPSK modulated. W is given as follows.

$$W = \frac{1+j}{\sqrt{2}} \cdot \begin{bmatrix} c_0 \\ c_1 \\ c_2 \\ c_3 \end{bmatrix} = \frac{1+j}{\sqrt{2}} \cdot \begin{bmatrix} 1 & 1 & 1 & 1 \\ 1 & -1 & 1 & -1 \\ 1 & 1 & -1 & -1 \\ 1 & -1 & -1 & 1 \end{bmatrix} \quad \text{Equation 8}$$

Accordingly, the matrix after the despreading process is given as follows.

$$\begin{bmatrix} \hat{c}_0 \\ \hat{c}_1 \\ \hat{c}_2 \\ \hat{c}_3 \end{bmatrix} \cdot W^H = \begin{bmatrix} 2\alpha+2\gamma & 0 & 2\alpha-2\gamma & 0 \\ 0 & 2\alpha+2\gamma & 0 & 2\alpha-2\gamma \\ 2\alpha-2\gamma & 0 & 2\alpha+2\gamma & 0 \\ 0 & 2\alpha-2\gamma & 0 & 2\alpha+2\gamma \end{bmatrix} - \quad \text{Equation 9}$$

$$j \cdot \begin{bmatrix} 0 & 2\beta+2\delta & 0 & 2\beta-2\delta \\ -2\beta-2\delta & 0 & -2\beta+2\delta & 0 \\ 0 & 2\beta-2\delta & 0 & 2\beta+2\delta \\ -2\beta+2\delta & 0 & -2\beta-2\delta & 0 \end{bmatrix}$$

$$= D + I$$

In Equation 9, desired signal components exist on only a diagonal line of a matrix D, and all other elements of the matrixes D and I are components generated from the mutual interference due to the SFBC and the channel estimation error. If it is assumed that a channel environment is similar with respect to four consecutive Walsh code chips in order to further facilitate the analysis, the following assumption is possible.

$$\alpha \approx \gamma, \beta \approx \delta \quad \text{Equation 10}$$

From the assumption, the matrixes D and I of Equation 9 are given as follows.

$$D \approx \alpha \cdot \begin{bmatrix} 4 & 0 & 0 & 0 \\ 0 & 4 & 0 & 0 \\ 0 & 0 & 4 & 0 \\ 0 & 0 & 0 & 4 \end{bmatrix}, I \approx -j\beta \cdot \begin{bmatrix} 0 & 4 & 0 & 0 \\ -4 & 0 & 0 & 0 \\ 0 & 0 & 0 & 4 \\ 0 & 0 & -4 & 0 \end{bmatrix} \quad \text{Equation 11}$$

Under such assumption, it can be seen that only elements except 0 in the matrix I are mutual interference components. That is, Walsh code pairs ($c_0$, $c_1$) and ($c_2$, $c_3$) experience mutual interference severer than that of other Walsh code pairs.

The interference imbalance problem causes a problem that, if only two user equipments (UEs) exist in the system when ACK/NACK information is spread using the Walsh codes in a physical hybrid ARQ indicator channel (PHICH) of a 3GPP LTE system and is transmitted by the SFBC scheme, the UEs obtain different performances according to the Walsh codes applied to the UEs.

First, according to the PHICH standard of the 3GPP LTE, in the embodiment of the present invention, it is considered that the PHICH is repeated n times for transmission of the ACK/NACK information. It is assumed that n=3 in the current standard, but, in the present embodiment, the value of n is not restricted. In the present embodiment, the following method is suggested such that a performance difference due to the interference imbalance is solved and all Walsh code pairs have similar performance.

That is, in the present embodiment, a method of continuously using the Walsh codes as the spread codes similar to the existing method and using different Walsh codes in every repetition in order to solve the performance difference due to the interference imbalance is suggested. For Walsh code hopping, in the present embodiment, a suitable hopping form during n-time repetition is designed and suggested.

In order to design the suitable hopping form, an interference matrix I introduced in the mathematical model is considered again. From the matrix I, it can be seen that the Walsh code pairs $(c_0, c_1)$ and $(c_2, c_3)$ experience interference severer than that of the other pairs. Accordingly, in order to reduce the interference from the pairs, the Walsh codes are grouped to one group and the hopping form is designed such that Walsh codes belonging to the same group are not transmitted in the same repetition if possible. For mathematical analysis, the groups respectively correspond to 0 and 1 as follows.

$$(c_0,c_1) \to 0, (c_2,c_3) \to 1 \quad \text{Equation 12}$$

Alternatively, correspondence of $(c_0,c_1) \to 1, (c_2,c_3) \to 0$ may be considered. From such correspondence, it can be seen that a problem that the transmission of the Walsh codes belonging to the same group in the same repetition is minimized corresponds to a problem that a binary (n, k) code in which the length of a code word is n and a minimum hamming distance between code words is as large as possible is designed. At this time, k is decided by the maximum number of UEs supported by the Walsh codes. Since the SF of the Walsh codes considered in the present embodiment is 4, the maximum number of UEs which can be supported using the Walsh codes is 4. If I/Q multiplexing is considered, the maximum number of UEs which can be supported is 8.

1) In the Case where I/Q Multiplexing is not Considered: k=2

If I/Q multiplexing is not considered, since the Walsh codes having the SF of 4 are used, the maximum number of UEs which can be supported is 4. Accordingly, since four patterns are necessary for Walsh code hopping, k=2 and thus an (n, 2) binary code should be designed for the Walsh code hopping pattern. In this binary code, the minimum hamming distance should be as large as possible.

Since the minimum hamming distance of the (n, 2) binary code is theoretically smaller than or equal to n−1 by Singleton bound, an optimal hopping form is designed by designing an (n, 2) binary code which satisfies an upper limit, that is, which is a minimum hamming distance of n−1. However, it is noted that the code having such a minimum hamming distance cannot be always designed with respect to all n.

Figure 4:
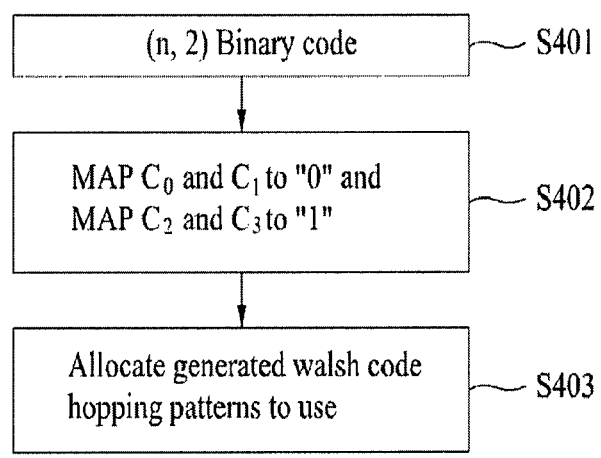
FIG. 4 is a view showing an example of an algorithm for summarizing a method of forming a Walsh code hopping pattern and allocating Walsh codes in every user equipment (UE) and repetition when I/Q multiplexing is not considered, according to an embodiment of the present invention.

FIG. 4 is a view showing an example of an algorithm for summarizing a method of forming a Walsh code hopping pattern and allocating Walsh codes in every user equipment (UE) and repetition when I/Q multiplexing is not considered, according to an embodiment of the present invention.

First, in a step S401 of FIG. 4, an (n, 2) binary code of which a minimum hamming distance is as large as possible is designed. Thereafter, in the designed (n, 2) binary code, $c_0=(1,1,1,1)$ or $c_1=(1,-1,1,-1)$ is allocated to a position of a code word 0 and $c_2=(1,1,-1,-1)$ or $c_3=(1,-1,-1,1)$ is allocated to a position of a code word 1 (S402). Although the above-described mapping relationship is shown in FIG. 4, $c_2=(1,1,-1,-1)$ or $c_3=(1,-1,-1,1)$ may be allocated to the position of the code word 0 and $c_0=(1,1,1,1)$ or $c_1=(1,-1,1,-1)$ may be allocated to the position of the code word 1. In the step S402, in order to avoid self-interference, it is noted that the same Walsh code is not allocated to the value 0 or 1 of the same position of the different code words.

Thereafter, in a step S403, the Walsh codes are allocated to the UEs according to the Walsh code hopping forms.

Meanwhile, when the code satisfying the suggested property is designed, various modifications can be considered. At this time, it is noted that the modifications should be performed under the condition that the hamming distance between the code words is not changed. For convenience of description, it is assumed that code words are collected to configure a matrix. That is, it is assumed that the code words configure each row of the matrix. At this time, as an example of the modification, it is considered that 0 and 1 are exchanged with each other in the whole matrix. As another modification, it is considered that portions of code words are exchanged with each other (exchange between columns). This modification does not change the minimum hamming distance characteristic of the codes and thus may be considered as a modification for the design of the Walsh code hopping pattern.

2) In the Case where I/Q Multiplexing is Considered: k=3

If I/Q multiplexing is considered in the transmission of the Walsh codes, a total of 8 UEs can be supported and, in this case, k=3. At this time, if it is assumed that I/Q multiplexing has an influence on only the increase of the UE and does not have an influence on performance, the Walsh code hopping pattern design problem corresponds to the design of an (n, 3) binary code. In this binary code, the minimum hamming distance should be as large as possible.

Since the upper limit of the minimum hamming distance of the (n, 3) binary code is n−2 by Singleton bound, an optimal hopping form is designed by designing an (n, 3) binary code having a minimum hamming distance of n−2.

Figure 5:
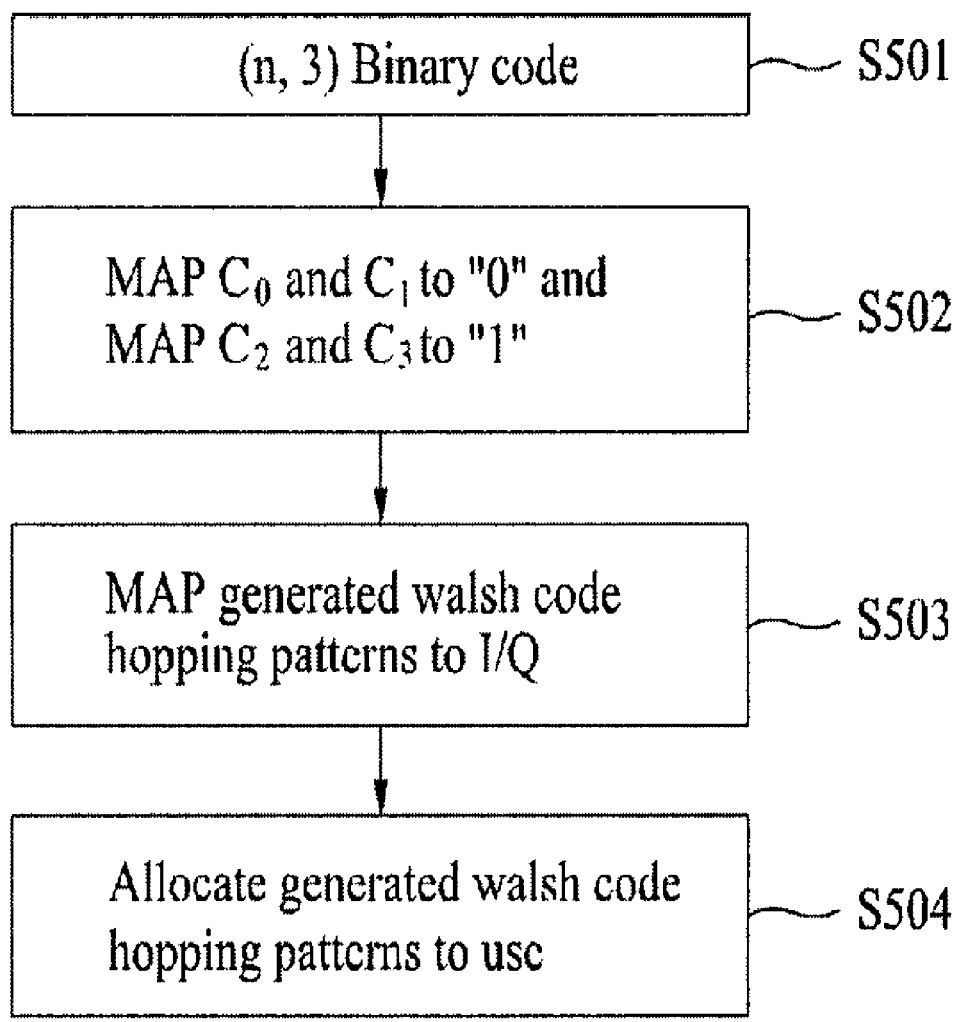
FIG. 5 is a view showing an example of an algorithm for summarizing a method of forming a Walsh code hopping pattern and allocating Walsh codes in every UE and repetition when I/Q multiplexing is considered.

FIG. 5 is a view showing an example of an algorithm for summarizing a method of forming a Walsh code hopping pattern and allocating Walsh codes in every UE and repetition when I/Q multiplexing is considered.

First, in a step S501, an (n, 3) binary code of which a minimum hamming distance is as large as possible is designed. Thereafter, in the designed binary code, $c_0=(1,1,1,1)$ or $c_1=(1,-1,1,-1)$ is allocated to a position of a code word 0 and $c_2=(1,1,-1,-1)$ or $c_3=(1,-1,-1,1)$ is allocated to a position of a code word 1 (S502). Although the above-described mapping relationship is shown in FIG. 5, $c_2=(1,1,-1,-1)$ or $c_3=(1,-1,-1,1)$ may be allocated to the position of the code word 0 and $c_0=(1,1,1,1)$ or $c_1=(1,-1,1,-1)$ may be allocated to the position of the code word 1.

Thereafter, in a step S503, the allocated Walsh codes are freely mapped to I or Q. At this time, in order to avoid self-interference at the time of I/Q multiplexing, it is noted that one Walsh code is not allocated to both I and Q in one-time repetition. Thereafter, in a step S504, the Walsh codes are allocated to the UEs according to the Walsh code hopping forms.

Even in this binary code, similar to 1) the case where I/Q multiplexing is not considered, modifications using the inversion ($0 \to 1$, $1 \to 0$) of the elements of the matrix configured by the code words and the exchange of the columns may be considered. The Walsh code hopping pattern modified from the code words obtained by such modifications can be obtained.

Hereinafter, an embodiment in which the concept of the above-described embodiment is applied to the case where ACK/NACK information is transmitted via the PHICH of the 3GPP LTE standard will be described. In the current standard, the PHICH is allowed to be repeated three times in order to transmit the same ACK/NACK information.

Accordingly, in the present embodiment, n=3 is considered.

3-1) In the Case where I/Q Multiplexing is not Considered

If I/Q multiplexing is not considered, since the Walsh code having the SF of 4 is used in the PHICH of the 3GPP LTE, the maximum number of UEs which can be supported is four. Accordingly, since four patterns are necessary for Walsh code hopping, k=2. A (3, 2) binary code having a minimum hamming distance of 2 should be designed for a Walsh code hopping pattern. From the code theory, it can be seen that the (3, 2) code is a simplex code given by each row of a matrix $P_4$.

$$P_4 = \begin{bmatrix} 0 & 0 & 0 \\ 0 & 1 & 1 \\ 1 & 1 & 0 \\ 1 & 0 & 1 \end{bmatrix} \quad \text{Equation 13}$$

In the matrix $P_4$, each row indicates the hopping pattern of the Walsh code allocated to each UE and each column indicates one of three-time repetitions of the transmission signals. If all the UEs transmit their Walsh codes in the same phase (I or Q), it is noted that the same Walsh code is not allocated to any one column of the matrix $P_4$, in order to avoid self-inference.

Figure 6:
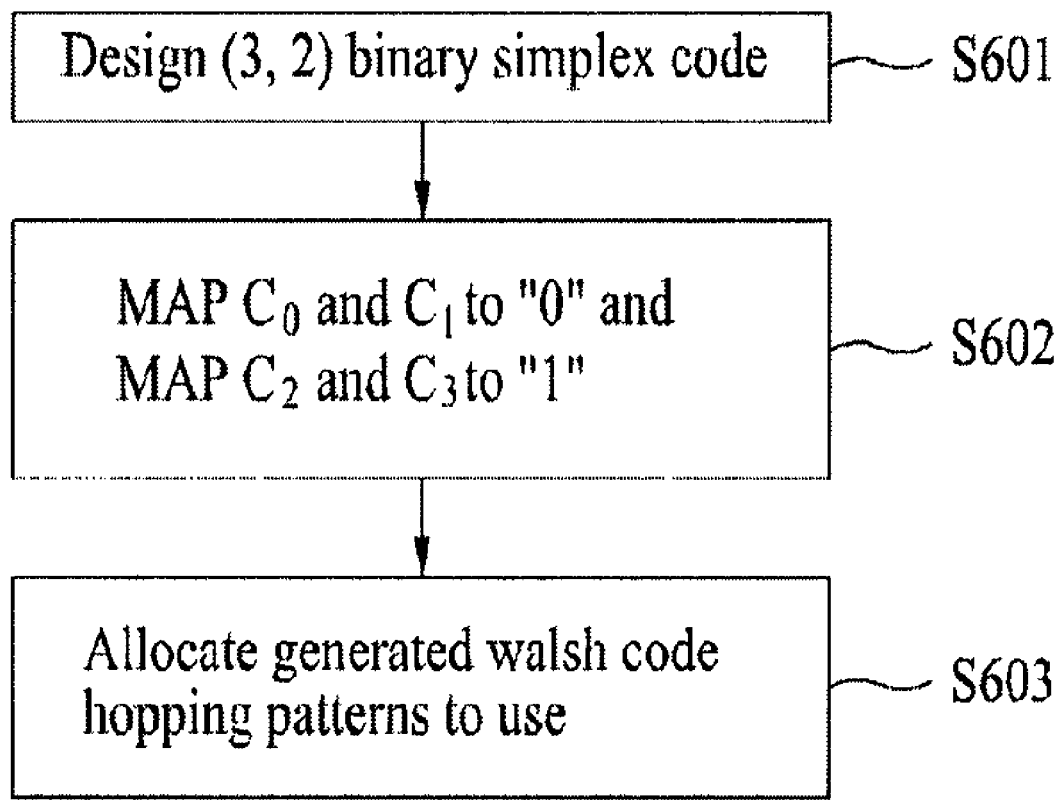
FIG. 6 is a view showing an algorithm for summarizing a method of allocating Walsh codes when the Walsh codes are repeated three times and I/Q multiplexing is not considered, according to the present embodiment.

FIG. 6 is a view showing an algorithm for summarizing a method of allocating Walsh codes when the Walsh codes are repeated three times and I/Q multiplexing is not considered, according to the present embodiment.

First, in a step S601, a (3, 2) binary simplex code $P_4$ is designed. In this simplex code, $c_0=(1,1,1,1)$ or $c_1=(1,-1,1,-1)$ is allocated to a position of a code word 0 and $c_2=(1,1,-1,-1)$ or $c_3=(1,-1,-1,1)$ is allocated to a position of a code word 1 (S602). Alternatively, $c_2=(1,1,-1,-1)$ or $c_3=(1,-1,-1,1)$ may be allocated to the position of the code word 0 and $c_0=(1,1,1,1)$ or $c_1=(1,-1,1,-1)$ may be allocated to the position of the code word 1. At this time, it is noted that the same Walsh code is not allocated to the value of 0 or 1 of the same position of different code words in order to avoid self-interference.

Thereafter, in a step S603, the Walsh codes are allocated to the UEs according to the Walsh code hopping forms.

Since the (3, 2) binary simplex code of the matrix $P_4$ is an optimal code having a largest minimum hamming distance satisfying the upper limit of Singleton bound under the given code length and dimension, the hopping pattern defined by the corresponding code is an optimal hopping pattern in the given number of Walsh codes and the number of times of repetition.

Meanwhile, a modification of the matrix $P_4$ shown in Equation 13 is considered. At this time, an example of the modification, first, it is considered that 0 and 1 are exchanged with each other in the whole matrix. This modification corresponds to the following matrix $P_{4A}$. As another modification, the exchange of portions of code words (the exchange of columns) may be considered. This modification corresponds to the following matrix $P_{4B}$.

$$P_4 = \begin{bmatrix} 0 & 0 & 0 \\ 0 & 1 & 1 \\ 1 & 1 & 0 \\ 1 & 0 & 1 \end{bmatrix} \to P_{4A} = \begin{bmatrix} 1 & 1 & 1 \\ 1 & 0 & 0 \\ 0 & 0 & 1 \\ 0 & 1 & 0 \end{bmatrix}, \quad \text{Equation 14}$$

$$P_{4B} = \begin{bmatrix} 0 & 0 & 0 \\ 0 & 1 & 1 \\ 1 & 0 & 1 \\ 1 & 1 & 0 \end{bmatrix}$$

In an actual Walsh code hopping pattern, a method for allocating the code words (rows) of the several possible code matrixes to the UEs, exclusively allocating $c_0$ and $c_1$ to the UEs when the same bit 0 is allocated, and exclusively allocating $c_2$ and $c_3$ to the UEs when the bit 1 is allocated may be considered. The sequence of allocating one of two codes to one bit may be randomly selected. A method for allocating $c_2$ and $c_3$ to the bit 0 and allocating $c_0$ and $c_1$ to the bit 1 may be considered.

The following Tables 1 to 4 show various examples of the Walsh code hopping pattern.

TABLE 1

|  | Slot 1 | Slot 2 | Slot 3 |
| --- | --- | --- | --- |
| UE1 | $c_0$ | $c_0$ | $c_0$ |
| UE2 | $c_1$ | $c_2$ | $c_2$ |
| UE3 | $c_2$ | $c_3$ | $c_1$ |
| UE4 | $c_3$ | $c_1$ | $c_3$ |

TABLE 2

|  | Slot 1 | Slot 2 | Slot 3 |
| --- | --- | --- | --- |
| UE1 | $c_0$ | $c_1$ | $c_0$ |
| UE2 | $c_1$ | $c_3$ | $c_2$ |
| UE3 | $c_2$ | $c_2$ | $c_1$ |
| UE4 | $c_3$ | $c_0$ | $c_3$ |

TABLE 3

|  | Slot 1 | Slot 2 | Slot 3 |
| --- | --- | --- | --- |
| UE1 | $c_0$ | $c_1$ | $c_1$ |
| UE2 | $c_1$ | $c_2$ | $c_2$ |
| UE3 | $c_3$ | $c_3$ | $c_0$ |
| UE4 | $c_2$ | $c_0$ | $c_3$ |

TABLE 4

|  | Slot 1 | Slot 2 | Slot 3 |
| --- | --- | --- | --- |
| UE1 | $c_2$ | $c_2$ | $c_3$ |
| UE2 | $c_3$ | $c_0$ | $c_1$ |
| UE3 | $c_1$ | $c_1$ | $c_2$ |
| UE4 | $c_0$ | $c_3$ | $c_0$ |

Tables 1 to 4 show examples of basically allocating a simplest matrix $P_4$. A modified pattern in which another matrix is basically allocated is possible. In Table 1, if the same bit 0 is allocated, $c_0$ and $c_1$ are sequentially allocated and, if the bit 1 is allocated, $c_2$ and $c_3$ are sequentially allocated. However, as described above, since the interference amounts of $c_0$ and $c_1$ are symmetrical and $c_2$ and $c_3$ give the same interference amount, the desired property is maintained although the allocation sequence is randomly changed. That is, a method for sequentially allocating $c_0$ and $c_1$ when the actual Walsh code is allocated to the bit 0 and sequentially allocating $c_1$ and $c_0$ next time may be considered.

The case where the allocation sequence is changed in every repetition as described above is shown in Table 2. The case where the allocation sequence is randomly changed instead of the alternating allocation as shown in Table 3 is possible. The method for randomly allocating $c_2$ and $c_3$ to the bit 0 and allocating $c_0$ and $c_1$ to the bit 1 as shown in Tale 4 is possible.

Now, the number of Walsh code hopping patterns which can be obtained from the matrix $P_4$ and the rule corresponding thereto will be considered.

Each element of the following matrix $N_4$ indicates the number of cases of the Walsh code which can correspond to each element of the matrix $P_4$. At this time, if it is considered that different Walsh codes should be allocated to two 0s or 1s in each column of the matrix $P_4$, the matrix $N_4$ can be readily obtained.

$$P_4 = \begin{bmatrix} 0 & 0 & 0 \\ 0 & 1 & 1 \\ 1 & 1 & 0 \\ 1 & 0 & 1 \end{bmatrix} \rightarrow N_4 = \begin{bmatrix} 2 & 2 & 2 \\ 1 & 2 & 2 \\ 2 & 1 & 1 \\ 1 & 1 & 1 \end{bmatrix} \quad \text{Equation 15}$$

Accordingly, the number of cases of different Walsh code hopping patterns is equal to a product of all elements of the matrix $N_4$ and, if a total of four UEs transmit the Walsh codes in the same phase (I or Q), it can be seen that a total of 64 different hopping patterns exist, from the matrix $P_4$ and the rule corresponding thereto.

3-2) In the Case where I/Q Multiplexing is Considered

If I/Q multiplexing is considered in the transmission of the Walsh code, a total of eight UEs can be supported. In this case, k=3. Accordingly, the Walsh code hopping pattern design problem corresponds to the design of a (3, 3) binary code. However, such a binary code is only all possible binary 3-tuples given by each row of the matrix $P_8$ as follows and the minimum hamming distance of such a binary code becomes 1.

$$P_8 = \begin{bmatrix} P_4 \\ P_4' \end{bmatrix} = \begin{bmatrix} 0 & 0 & 0 \\ 0 & 1 & 1 \\ 1 & 1 & 0 \\ 1 & 0 & 1 \\ 0 & 0 & 1 \\ 0 & 1 & 0 \\ 1 & 0 & 0 \\ 1 & 1 & 1 \end{bmatrix} \quad \text{Equation 16}$$

It is noted that the matrix $P_8$ may be configured by the connection of two different (3, 2) simplex codes. Since I/Q multiplexing does not have an influence on performance, it may freely correspond to any element of the matrix $P_8$.

Figure 7:
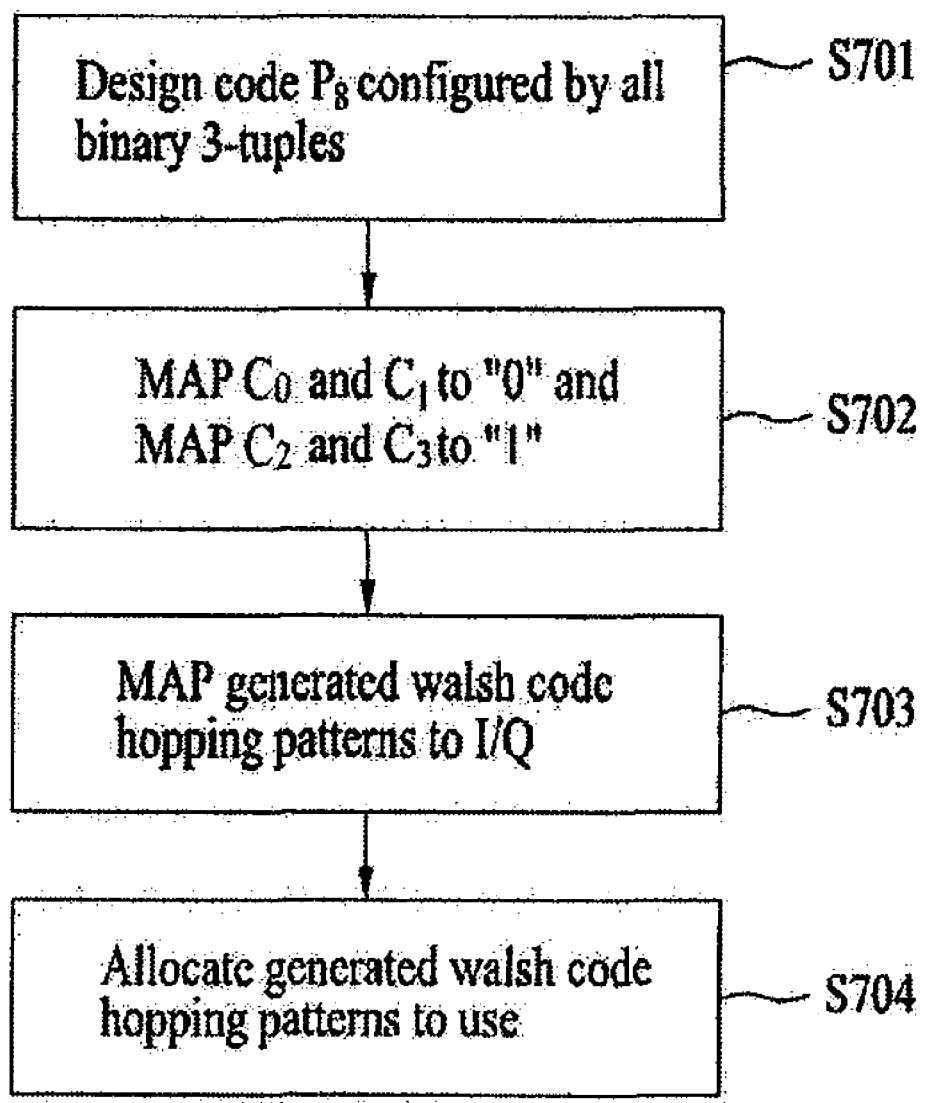
FIG. 7 is a view showing an algorithm for summarizing a method of allocating Walsh codes in every UE and repetition when the Walsh codes are repeated three times and I/Q multiplexing is considered, according to the present embodiment.

FIG. 7 is a view showing an algorithm for summarizing a method of allocating Walsh codes in every UE and repetition when the Walsh codes are repeated three times and I/Q multiplexing is considered, according to the present embodiment.

First, in a step S701, a code $P_8$ configured by all binary 3-tuples is designed. Thereafter, in this code, $c_0$=(1,1,1,1) or $c_1$=(1,-1,1,-1) is allocated to a position of a code word 0 and $c_2$=(1,1,-1,-1) or $c_3$=(1,-1,-1,1) is allocated to a position of a code word 1 (S702). Alternatively, as described above, $c_2$=(1,1,-1,-1) or $c_3$=(1,-1,-1,1) may be allocated to the position of the code word 0 and $c_0$=(1,1,1,1) or $c_1$=(1,-1,1,-1) may be allocated to the position of the code word 1. Thereafter, the allocated Walsh codes are freely mapped to I or Q and are transmitted (S703). At this time, in order to avoid self-interference at the time of I/Q multiplexing, it is noted that one Walsh code is not allocated to the same I or Q in one repetition. Finally, the Walsh codes are allocated to the UEs according to the Walsh code hopping forms (S704).

Table 5 shows an example of the Walsh code hopping pattern which can be obtained from such an algorithm.

TABLE 5

|     | Slot 1 | Slot 2 | Slot 3 | I/Q multiplexing |
| --- | --- | --- | --- | --- |
| UE1 | $c_0$ | $c_0$ | $c_0$ | I |
| UE2 | $c_1$ | $c_2$ | $c_3$ |   |
| UE3 | $c_2$ | $c_3$ | $c_1$ |   |
| UE4 | $c_3$ | $c_1$ | $c_2$ |   |
| UE5 | $c_0$ | $c_1$ | $c_2$ | Q |
| UE6 | $c_1$ | $c_3$ | $c_0$ |   |
| UE7 | $c_2$ | $c_0$ | $c_1$ |   |
| UE8 | $c_3$ | $c_2$ | $c_3$ |   |

If any Walsh code is allocated to one UE in I in any one repetition in Table 5, it is noted that the same Walsh code is allocated to another UE in Q.

Although, in the above-described embodiment, the example of spreading the signals using the Walsh codes and transmitting the signals by the Alamouti scheme is applied to the PHICH transmission, in the 3GPP LTE system and the system for performing the same function as the 3GPP LTE system, since the same signal is repeatedly transmitted within a given system band even in the PUCCH transmission, the same problem as the above-described embodiment may be generated. Accordingly, the hopping pattern generating method is applicable to the PUCCH transmission according to the number of times of repetition and the number of UEs.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

INDUSTRIAL APPLICABILITY

Interference randomization and a method for transmitting signals using the same of the embodiments of the present invention are applicable to any radio mobile system for spreading signals using orthogonal codes and transmitting the signals by the STBC or SFBC scheme, in addition to the 3GPP LTE system.

The invention claimed is:

1. A method for transmitting signals, the method comprising:
spreading transmission signals using a plurality of orthogonal codes having a same length; and
transmitting the spread transmission signals using a spatial frequency block coding (SFBC) scheme or a spatial time block coding (STBC) scheme,
wherein, among the plurality of orthogonal codes, codes having mutual interferences that are equal to or greater than a predetermined threshold are grouped together into two or more groups, and orthogonal codes belonging to different groups of the two or more groups are used for the spreading of the transmission signals, wherein the spread transmission signals are simultaneously transmitted at a certain timing, wherein the transmitting of the spread transmission signals is repeated n times, and wherein different orthogonal codes are used in each repetition for each of a plurality of user equipments (UEs).

2. The method according to claim 1, wherein the orthogonal codes are Walsh codes and the transmission signals spread by the Walsh codes are transmitted using the SFBC scheme.

3. The method according to claim 1, wherein the transmission signals are ACK/NACK signals transmitted via a physical hybrid ARQ indicator channel (PHICH).

4. The method according to claim 1, wherein the transmission signals are uplink control signals transmitted via a physical uplink control channel (PUCCH).

5. The method according to claim 1, wherein the orthogonal codes used in each repetition are decided by a specific orthogonal code hopping pattern for each of the plurality of UEs, and wherein the specific orthogonal code hopping pattern is decided by:

generating an (n, k) binary code having a largest minimum Hamming distance, wherein a maximum number of the plurality of UEs for transmitting the transmission signals is N, where $N=2^k$;

mapping each of the two or more groups of the orthogonal codes to "0" or "1" of the generated binary codes;

determining an orthogonal code in each repetition for each of the plurality of UEs; and allocating orthogonal code hopping patterns, which are mapped to the generated binary codes, to each of the plurality of UEs.

6. The method according to claim 5, wherein the mapping each of the groups of the orthogonal codes is performed using modified binary codes, wherein the (n, k) binary code is represented as a matrix having elements of "0" or "1", and wherein the modified binary codes are generated by exchanging the elements "0" and "1" of the (n, k) binary code with each other in the matrix, or exchanging portions of the (n, k) binary code between columns of the matrix.

7. A device configured to transmit signals, comprising:
a transmitter configured to
spread transmission signals using a plurality of orthogonal codes having a same length, and
transmit the spread transmission signals using a spatial frequency block coding (SFBC) scheme or a spatial time block coding (STBC) scheme,
wherein, among the plurality of orthogonal codes, codes having mutual interferences that are equal to or greater than a predetermined threshold are grouped together into two or more groups, and orthogonal codes belonging to different groups of the two or more groups are used for the spreading of the transmission signals,
wherein the spread transmission signals are simultaneously transmitted at a certain timing,
wherein the transmitting of the spread transmission signals is repeated n times, and
wherein different orthogonal codes are used in each repetition for each of a plurality of user equipments (UEs).

8. A device configured to receive signals, comprising:
a receiver configured to
receive spread transmission signals using a spatial frequency block coding (SFBC) scheme or a spatial time block coding (STBC) scheme, and
despread the received transmission signals using a plurality of orthogonal codes having a same length, and
wherein, among the plurality of orthogonal codes, codes having mutual interferences that are equal to or greater than a predetermined threshold are grouped together into two or more groups, and orthogonal codes belonging to different groups of the two or more groups are used for the spreading of the transmission signals,
wherein the spread transmission signals are simultaneously transmitted at a certain timing,
wherein the spread transmission signals are repeated transmitted n times, and
wherein different orthogonal codes are used in each repetition for each of a plurality of user equipments (UEs).

* * * * *